United States Patent Office 2,699,887
Patented Jan. 18, 1955

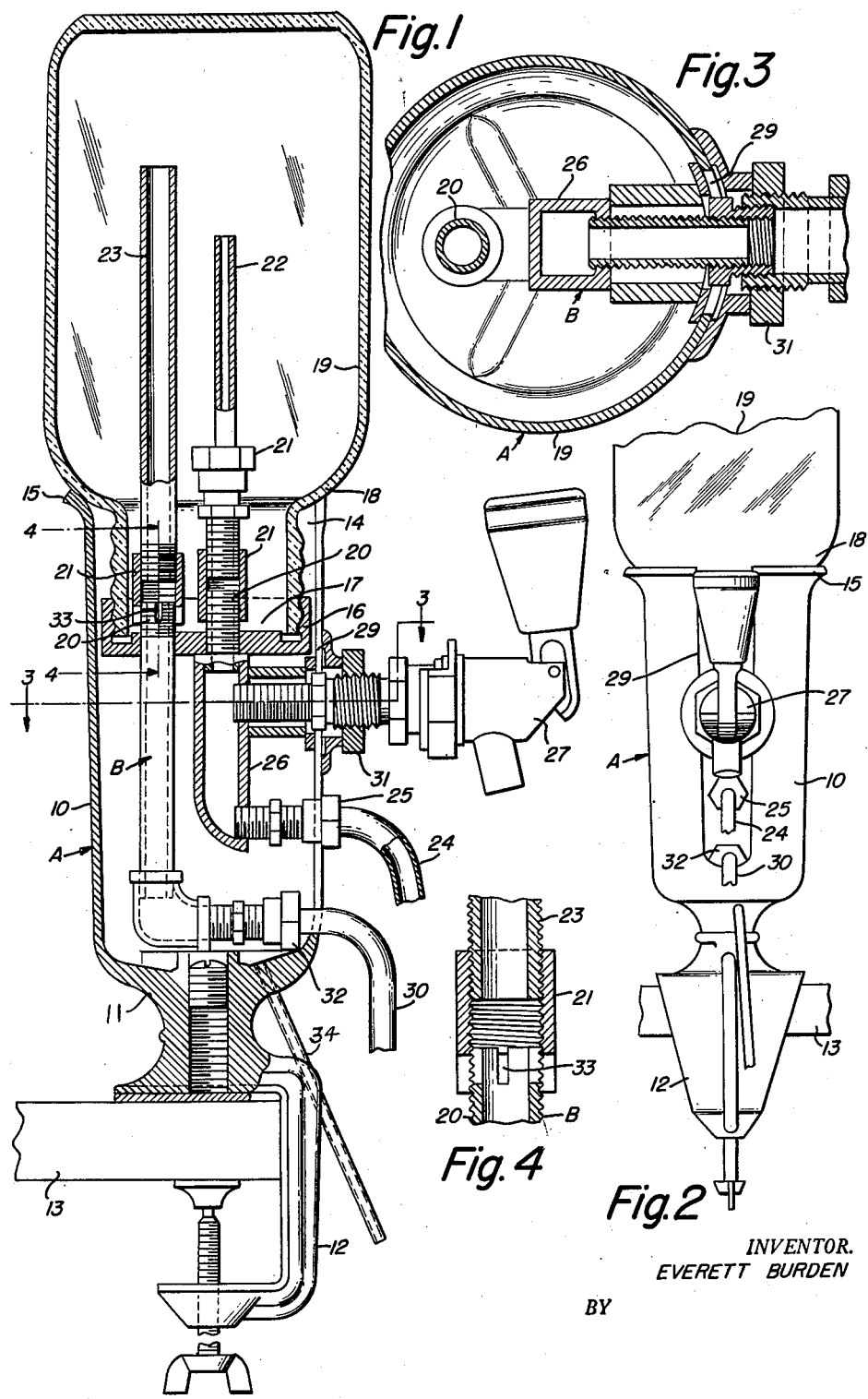

2,699,887

DISPLAY AND DISPENSING DEVICE

Everett Burden, Cleveland, Ohio

Application August 16, 1954, Serial No. 450,154

3 Claims. (Cl. 222—154)

This invention relates to a display and dispensing apparatus or device for chilled liquids and is a continuation in part of Everett Burden application filed April 7, 1950, Serial No. 154,623.

The primary object of the present invention is the provision of an apparatus or device of this character, wherein the chilled liquid is dispensed directly from its source of supply and not from the display medium, comprising a display container having walls through which a liquid contained therein may be visually observed, which in this instance is a transparent jug or reservoir, the latter being detachably held in association with a supporting stand or base that can be arranged to the best advantage upon a counter or other like element, so that a maximum display of the content of the jug or reservoir will be assured.

Another object of this invention is the provision of an apparatus or device of this character, wherein the chilled liquid has a free circulating cycle of flow to and from the cooling unit and the display medium without any possibility of a trapping of such liquid in its fluidity, the apparatus being for the purpose of displaying and dispensing of drinking liquids, for example beverages or the like.

A further object of this invention is the provision of an apparatus or device of this character, wherein the entire content of the jug or reservoir can be completely emptied of its content prior to its removal from the supporting stand or base so as to eliminate any waste or loss of the liquid when it is desired to clean the apparatus or device for sanitary purposes.

A still further object of the invention is the provision of an apparatus or device of this character, wherein the inlet and outlet stand pipes or tubes within the jug or reservoir are removed from each other and the inlet pipe or tube is of less height than the outlet pipe, so as to assure a maximum spraying activity of the liquid contained within the said jug or reservoir at the upper portion of the latter, the liquid entering the latter being under pressure and thus a pleasing display in turbulent fashion within the said jug or reservoir is assured during the operation of the apparatus or device.

A still further object of this invention is the provision of an apparatus or device of this character wherein the inlet and outlet tubes or pipes within the jug or reservoir are axially adjustable with respect to each other and thereby altering the spraying action and the liquid level within said jug or reservoir.

A still further object of this invention is the provision of an apparatus or device of this character, wherein spraying activity of the liquid within the jug or reservoir will not be materially disturbed during the dispensing of the liquid at the faucet or spigot of the said apparatus or device.

A still further object of this invention is the provision of an apparatus or device of this character, wherein the jug or reservoir and its adjuncts are removable as a unit from the stand or base with ease and dispatch while the said jug or reservoir is susceptible of being drained resultant from condensation accumulating on the jug or reservoir and within the said stand or base.

A still further object of this invention is the provision of an apparatus or device of this character, which is extremely simple in construction, thoroughly reliable and efficient in operation and purpose, strong, durable, neat and attractive in appearance, possessed of few parts, readily assembled and disassembled, it being novel in assembly, and inexpensive to manufacture and install.

Other objects and a fuller understanding of the invention may be had by referring to the following description and claims, taken in conjunction with the accompanying drawing, in which:

Figure 1 is a fragmentary vertical sectional view through the apparatus or device constructed in accordance with the invention;

Figure 2 is a fragmentary rear elevation of the apparatus or device;

Figure 3 is a sectional view taken approximately on line 3—3 of Figure 1 looking in the direction of the arrows; and Figure 4 is a fragmentary detail sectional view taken approximately on line 4—4 of Figure 1.

Similar reference characters indicate corresponding parts throughout the several views of the drawing.

Referring to the drawing in detail, A designates generally a stand or base, which in this instance has the appearance of a hollow body 10 having a goblet-like formation with a bottom area 11 with a clamping jaw terminal 12, for the detachable fastening of the stand or base to a supporting bed, a portion of the same being indicated at 13, yet this terminal 12 may be dispensed with and any other method of fastening means may be substituted if found preferable. The stand or base A is preferably longitudinally elongated and its upper most end 14 is entirely open and has an outwardly rolled marginal edge or rim 15, as is apparent from Figures 1 and 2 of the drawing.

Removably and adjustably housed within the stand or base A is a combined jug or reservoir mouth closure or cap and a liquid feed and outlet return assembly unit denoted generally at B, which comprises a closure cap or the like 16 adapted for the detachable leak-proof fitting therewith the open mouth end 17 of the neck 18 of a jug or reservoir 19, which is partially inserted in the stand or base A through the uppermost open end 14 of the latter, so as to have the major body portion of this jug or reservoir exposed above the said stand or reservoir, as will be apparent in Figures 1 and 2 of the drawing. The cap or closure 16 has extending therethrough upstanding spaced parallel permanently fixed pipe or tube unions 20 to which are coupled at 21 detachable and vertically adjustable inlet and outlet pipes or tubes 22 and 23, respectively, these being adapted to rise within the jug or reservoir 19 from the uppermost side of the cap or closure 16. The pipe or tube 22 at its upper end terminates a determined distance below the uppermost end of the pipe or tube 23, which latter determines the liquid level within the jug or reservoir 19, while the pipe or tube 22 feeds the liquid within the latter under pressure from a cooled supply source, not shown, yet any other cooling system may be used for the chilling of the liquid delivered to the said jug or reservoir as may be found desirable. The liquid is delivered under pressure from the source of supply through the inlet line, only a portion being shown at 24, which is detachably coupled at 25, a flow union 26, the latter being attached to the pipe or tube nipple 20 having the pipe or tube 22, while detachably connected to this flow union 26 is a lever operated valved dispensing faucet or spigot 27, which may be of any selected type, the connection of the latter being located between the point of attachment of the line 24 and the under face of the cap 16. The rearmost area of the stand or base A is longitudinally slotted or bifurcated at 29, which opens through the upper open end 14 providing a clearance of the faucet or spigot 27 and the lines 24 and 30, respectively, the line 30 being the liquid return of the liquid cooling system as may be associated with the present apparatus or device. The combined jug or reservoir mouth closure or cap and the liquid feed and outlet return assembly unit B is removably and adjustably secured in the stand or base A by the associated lock washers and nuts denoted generally at 31, as should be apparent from Figures 1 and 2 and also 3 of the drawing. The line 30 has detachable union at 32 with the union 20 and both lines may be flexible or bendable for permitting the changing of the position of the apparatus or device on a support.

The union 20 for the pipe or tube 23 has provided therein drain slots or openings 33 which are located next to cap 16 so that drainage in a thorough manner can be had from the said cap 16 into the return line, and also these slots or openings 33 eliminate the possibility of trapping of liquid in the jug or reservoir or at any point in the system for circulation of the liquid and the display and dispensing operation of the apparatus or device.

The stand or base body 10 has at its bottom 11 a drain 34 which may lead to any point of deposit, and the purpose thereof is to take off any condensation accumulated within the said stand or base resultant from the chilled condition of the content of the jug or reservoir.

It should be apparent that when the faucet or spigot 27 is opened for dispensing liquid the latter will deliver a chilled quantity of fluid directly from the feed line 24 and not directly from the jug or reservoir, which liquid therein is less chilled or cooled than that coming directly from the line 24 under pressure from the source of chilled supply.

The jug or reservoir 19 is readily and easily separable from the cap 16 and likewise the assembly B is readily and easily removed from the stand or base A for cleaning purposes and additionally, the parts of the assembly B are detachable from each other, while the pipes or tubes 22 and 23, respectively, are susceptible of vertical adjustment with respect to each other, to vary the spraying operation of the apparatus or device, the liquid entering the jug or reservoir below the surface or level of such liquid within the latter has a further spraying activity thereon due to the incoming liquid being under pressure from the source of supply. In this manner a sparkling spraying activity of the liquid in the upper portion of the jug or reservoir is continuously had and maintained at all times during the operation of the apparatus or device, thus resultant in a decorative display thereby, while in the dispensing of the liquid the latter is assured thoroughly chilled for consumption.

By having outlet pipe 23 extend to a higher point in the container or body 10 than inlet tube 22, increased spraying activity results. Without this difference in height, the spraying effect would only result from the liquid being ejected through inlet tube 22, and this effect is merely in the nature of a small spray which strikes the top of body 10 and runs down the sides thereof. However, due to the extra height of outlet means 23, the liquid in the body is permitted to build up to this height. Therefore, the spray issuing from inlet 22 may act upon the built-up liquid in body 10 between the top of inlet 22 and the top of outlet 23 and in effect impart spraying activity to some of this liquid. Accordingly, the built-up liquid above the top of inlet 22 acts together with the spray 22 to form a mushrooming effect or double action spraying activity.

In order to provide a substantially full supply of fluid to the faucet spigot, and to keep the spray display operating during dispensing, the entire supply line to the tube 22, at least as far as spigot 27, is of a size to carry greater than a full dispensing flow. The tube 22 is of restricted size to act as a restricted orifice. A relatively small stream of rapidly moving fluid will suffice to produce the spray display effect. This small volume passing through tube 22 will not materially reduce the dispensing speed through spigot 27, because the supply line to the spigot is large enough to supply both the spigot and the tube 22.

From the foregoing it is thought that the construction and manner of operation of the apparatus or device constituting the present invention will be clearly understood and the advantages thereof, so a more extended explanation has been omitted for the sake of brevity.

It should be apparent that the cross-sectional diameter of the tube 23 is greater than the cross-sectional diameter of the tube 22 in order to regulate or control the volume of liquid within the container 19 at the upper area thereof. Obviously, since the liquid enters the tube 22 under pressure the input will be greater than the outflow by the tube 23 which is a gravity flow and unless the said tube 23 has a greater cross-sectional diameter than that of the tube 22 the turbulent effect will be reduced to a great extent in the uppermost portion of the container. Under the arrangement just mentioned the spray effect in the container is widespread and most decorative for display.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A beverage dispensing system, comprising a display container defined by walls through which a liquid contained therein may be visually observed, a nozzle extending into said space for directing fluid under pressure against said walls, a source of fluid under pressure, a supply line from said source to said nozzle in the display container, said nozzle in the display container being a restricted orifice with respect to the volume carrying capacity of said supply line, a dispensing outlet valve opening from said supply line to atmosphere at a position prior to said nozzle, and an outlet from said display container.

2. In the system of claim 1, the provision of placing said outlet with the opening thereof positioned to establish a pool of liquid in said display container at a height to fully cover said nozzle.

3. A displaying and dispensing apparatus for liquid comprising a closed display container having walls through which a liquid content therein may be visually observed, a hollow inlet passageway for ejecting liquid in said container, a dispensing faucet connected with said inlet passageway a substantial distance from the top thereof, the top of said passageway extending in said container, the interior diameter of the passageway from the top thereof to adjacent the connector of said dispensing faucet being considerably less than the interior diameter of the remaining portion of said passageway whereby increased pressure of the liquid adjacent the dispensing faucet results, an outlet passageway extending a substantial distance into said container, means for continuously feeding liquid under pressure through said inlet passageway into said container in the form of a spray, said inlet passageway extending in said container a height less than that of the outlet passageway whereby the spraying activity in said container is increased due to the difference in the level between said passageways, a separate drainage passageway adjacent the lowermost area of said container, said drainage passageway communicating with said outlet passageway, whereby possible trapping of liquid in said container is eliminated.

References Cited in the file of this patent

UNITED STATES PATENTS

| | | |
|---|---|---|
| 1,782,685 | Glaze et al. | Nov. 25, 1930 |
| 2,123,892 | Grady | July 19, 1938 |